W. J. GASKILL.
MULEY SAW.
No. 32,941. Patented July 30, 1861.
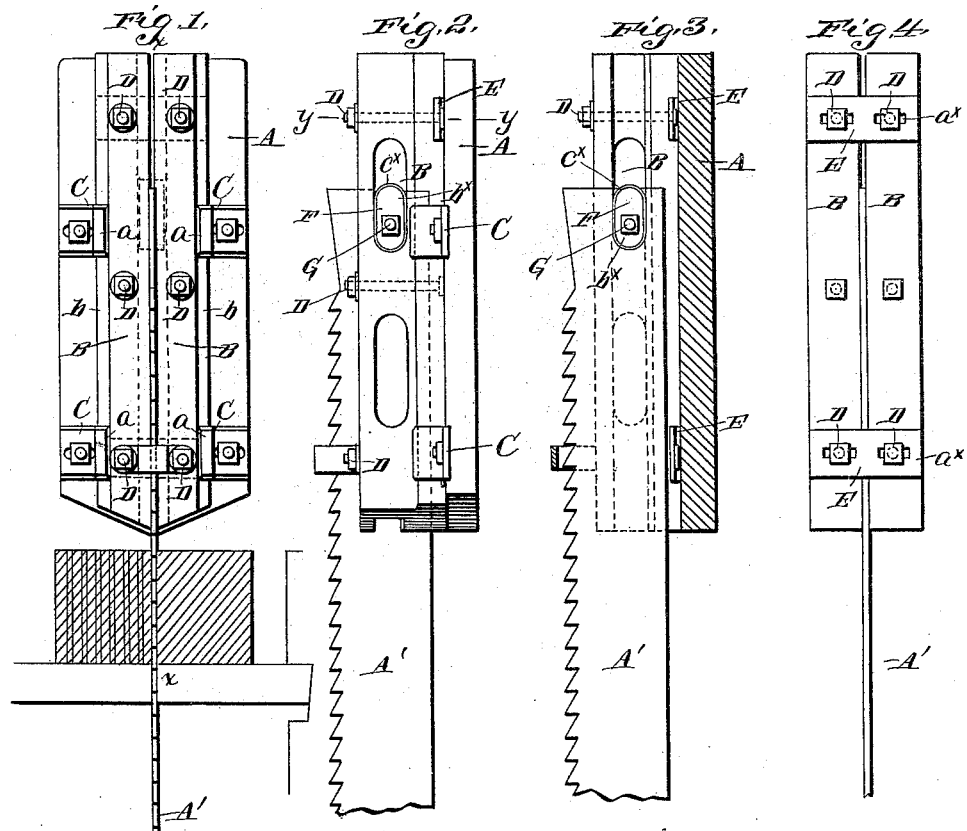
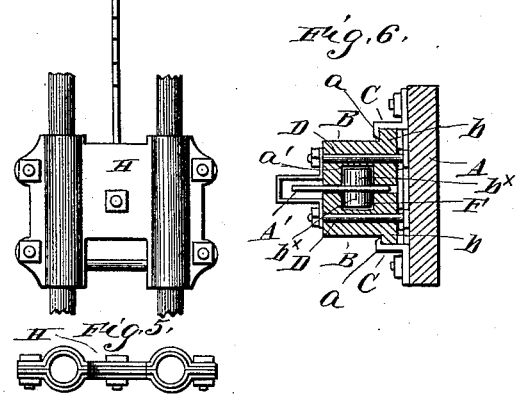
Witnesses:
J. W. Coombs
R. S. Spencer
Inventor:
W. J. Gaskill

UNITED STATES PATENT OFFICE.

W. J. GASKILL, OF APALACHIN, NEW YORK.

DEVICE FOR ADJUSTING THE RAKE OF MULEY-SAWS.

Specification of Letters Patent No. 32,941, dated July 30, 1861.

*To all whom it may concern:*

Be it known that I, W. J. GASKILL, of Apalachin, in the county of Tioga and State of New York, have invented a new and useful Improvement in Muley-Saws; and I do hereby declare that the following is a full, clear, and exact description of the same, reference being had to the annexed drawings, making a part of this specification, in which—

Figure 1, is a front or face view of my invention. Fig. 2, a side view of the same. Fig. 3, a section of the same taken in the line $x$—$x$, Fig. 1. Fig. 4, a detached back view of the clamps pertaining to the same. Fig. 5, a detached top view of the cross-head at the lower part of the saw. Fig. 6, a horizontal section of the clamps and bed-plank taken in the line $y$,—$y$, Fig. 2.

Similar letters of reference indicate corresponding parts in the several figures.

The object of this invention is to obtain a simple and efficient means for hanging the saw, whereby the same may be guided and made to operate perfectly true without any tremor or vibration, and due provision made for all looseness occasioned by wear and also for a necessary adjustment to vary the rake of the saw as occasion may require.

The invention consists in the employment or use of two casings or clamps connected together by bolts, and cross-bars and attached to a proper bed-plank, the above parts being used in connection with an adjustable slide, or guide attached to the upper part of the saw and fitted within the casings or clamps, all being arranged as hereinafter shown and described to effect the desired end.

To enable those skilled in the art to fully understand and construct my invention, I will proceed to describe it.

A, represents a bed-plank which is firmly secured to the framing of the mill, and B, B, are two casings or clamps which are attached to the bed-plank A, by hooked plates C, said plates C, being firmly bolted to the bed-plank A, their hooked ends $a$, projecting over cleats $b$, at the outer sides of the casings or clamps, as shown in Figs. 1, and 6.

The casings or clamps B, B, may be described as being formed of two parallel bars recessed or grooved at their inner sides to form a square opening $a'$, as shown clearly in Fig. 6. The casings or clamps are not adjusted closely together, sufficient space is allowed between them to receive the upper part of the saw A', and allow the same to work freely up and down. The casings or clamps are connected together by bolts D, which pass through them and through cross-plates E, at their backs, the bolt holes $a^x$, in both the casings and plates being oblong to admit of a lateral adjustment of the casings (see Fig. 4,) so that the casings may be made to fit snugly to the saw.

To the upper part of the saw A', there is attached a guide F. This guide is formed of two blocks, $b^x$ $b^x$, secured one at each side of the saw by one and the same screw bolt G, which has a square head that is "let in" one of the blocks $b^x$, the screw bolt passing through a square nut which is "let in" the other block $b^x$. This guide is fitted in the groove or square opening $a'$, and it is covered by leather strips $c^x$, which extend around the blocks $b^x$, $b^x$, and bear against the front and back sides of the opening $a'$.

The screw bolt G, does not pass through the centers of the blocks $b^x$, it passes through them a little at one side, see Figs. 2, and 3. By this arrangement more or less rake or inclination may be given the saw by turning or adjusting the guide F, for when the latter is turned so that its most prominent side is outward, the upper part of the saw will project farther out from the casings or clamps than if the guide be turned in the reverse position.

The lower end of the saw A', is attached to a metal cross-head H, which is fitted on proper guide rods, the cross-head being formed of metal plates with leather inserted between them, as shown in Fig. 5.

From the above description it will be seen that the saw A', may be made to run perfectly true at all times, without any vibration or play as the casings or clamps B, B, may be adjusted at any time when necessary so as to fit snugly to the saw and to grasp the greater portion of it above the log.

Having thus described my invention, what I claim as new, and desire to secure by Letters Patent, is;

The eccentric guide F employed in connection with the casings or clamps B B to adjust the rake of the saw as explained.

W. J. GASKILL.

Witnesses:
 T. W. BARTON,
 JOHN DECKER.